June 2, 1931.  G. F. YACKEY  1,808,094
HOSE CONNECTION
Filed March 30, 1929
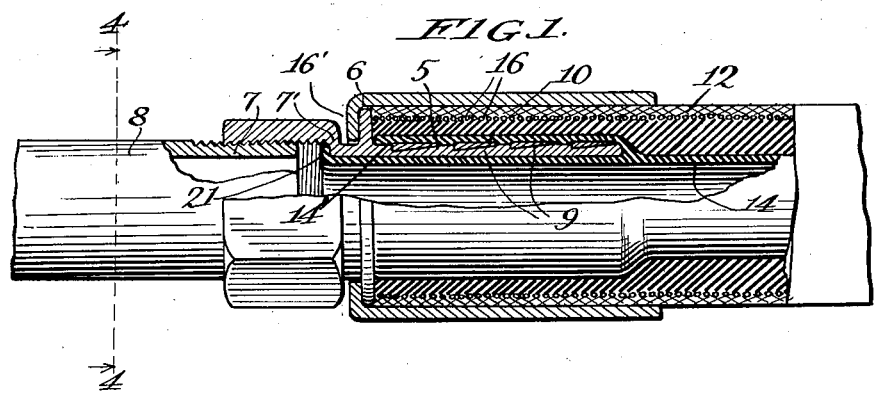
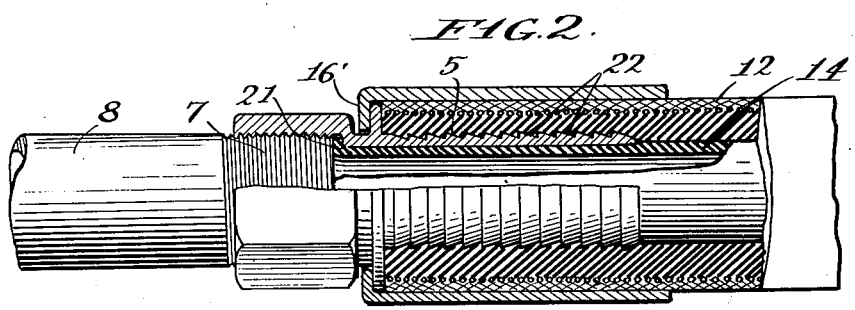
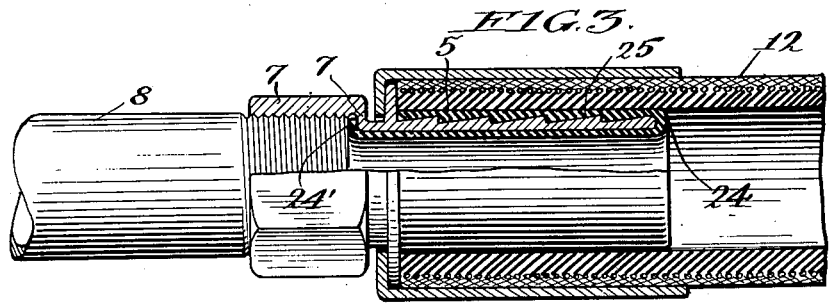
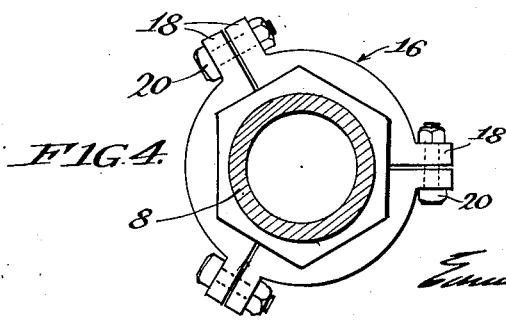
INVENTOR.
GEORGE F. YACKEY
ATTORNEYS.

Patented June 2, 1931

1,808,094

UNITED STATES PATENT OFFICE

GEORGE F. YACKEY, OF WHITTIER, CALIFORNIA, ASSIGNOR TO EARL B. WIGGINS, OF LOS ANGELES, CALIFORNIA

HOSE CONNECTION

Application filed March 30, 1929. Serial No. 351,134.

This invention relates to hose connections and is adapted especially for use with high pressure hose and with hose passing fluids which have a tendency to corrode the metal of the coupling.

The primary object of the invention is to provide a hose coupling of the general character stated in which the metal parts may be protected from attack by the fluids being conducted through the hose, and another object is to provide a fitting especially adapted to high pressure uses.

In the past, there has been no attempt so far as I am aware to protect hose couplings from the consuming effects of fluids which are commonly passed through rubber hose, such effects being mild have been considered insignificant, but they are nevertheless certain and the result has been that the life of the coupling has been inordinately shortened.

The present invention overcomes these objections, and broadly stated resides first, in providing a protecting element upon the inner walls of the coupling. This element may be in the form of a rubber lining, and according to one embodiment is a continuation of the inner lining of the hose attached to the coupling. The outer or forward end of this lining may be secured by a fitting received by the coupling.

The invention resides also in the provision of a split clamp provided with a flange, the clamp serving to bind the hose to the coupling and the flange engaging a collar to prevent slipping of the clamp and the end of the hose being retained.

In the accompanying drawings, wherein certain embodiments of the invention are disclosed by way of illustration:

Fig. 1 is chiefly a longitudinal section through a coupling to which a high pressure hose is secured, a pipe section being placed for threading into position to bind the free end of a rubber protecting lining which is here shown as a portion of the hose lining.

Fig. 2 is a similar view showing a slightly modified arrangement of lining and a variation in the hose retaining means.

Fig. 3 shows a still further lining arrangement, the lining being in the form of a separate piece.

Fig. 4 is a cross section taken from the line 4—4 of Fig. 1.

The improved coupling is here shown as comprising a tubular member 5 having near its forward end an annular abutment flange or collar 6 and provided at its forward extremity with an internally threaded connection 7 to receive the threaded end of a pipe 8 or other part to be coupled.

In the form of Fig. 1 the tubular element 5 is provided with rearwardly and outwardly inclined annular faces 9 which thus form frusto-conical bearings for rings 10 of similar design to be engaged by the body of a hose 12 passed thereover, the rings 10 causing a wedging action upon any tendency to displace the hose in a direction to the rear.

The hose 12 of said Fig. 1 is shown as provided with the usual rubber lining 14 and with a reinforcing wire winding 16. The lining 14 is split circularly and longitudinally to form an inner cylindrical lining portion 14′ for the inner walls of the tubular member 5, the rest of the lining 14 being passed over the outer walls of the member 5 and the wedges 10 along with the outer portions of the hose. The hose end is bound to said tubular member 5 and the wedge rings 10 by a split clamp 16 which may be in the form of two or more pieces provided with ears 18 which receive bolts 20. Each clamp part 16 is provided with a flange element 16′ which engages the forward face of the abutment collar 6. Therefore, when the clamp members 16 are securely mounted about the hose end with the flanges 16′ engaging over the collar 6, the clamp is positively retained against longitudinal movement. This in conjunction with the action of the wedge rings 10 insures against displacement of the hose. At the same time this mounting insures against the displacement of the lining 14′ or the breaking away of said lining from the hose lining 14, especially where the outer end 21 of said lining is clamped between the end of the pipe 8 and the offset 7′ at the back of connection 7.

In Fig. 2 the entire lining 14 is separated from the hose and used to protect inner walls of the tubular member 5, and a simple serrated outer surface is provided at 22 for engagement by the hose. In this figure, the pipe 8 is shown as actually threaded into position to engage the end 21 of said lining 14 and clamp it against the offset shoulder 7' of connection 7.

In Fig. 3 a separate lining 24 is used, this rubber sleeve being folded around both sides of the tubular part 5, the outer annular layer being engaged by the hose 12, and the outer extremity 24' of the inner layer being positioned for engagement between pipe 8 and connection 7 as in the other forms. Here wedging faces 25 like the faces 9 of Fig. 1 are employed but the split wedge rings are omitted. The plural clamps 16 are used here as in the other forms.

From the foregoing it will be clear that I have presented a highly serviceable structure for protecting the inner wall of couplings of the character disclosed and for retaining the hose end so as to avoid displacement of the lining.

I claim:

1. In combination, a hose coupling comprising a tubular member having an internal and an external shoulder intermediate the ends thereof, a series of external wedge shaped projections on one end of said coupling against which a hose section is adapted to be held with one end thereof abutting against the external shoulder, the opposite end of said coupling being internally threaded for cooperating with an externally threaded pipe section, a protecting lining for said coupling, one end of said lining being adapted to be clamped between the internal shoulder of the coupling and end of the pipe section.

2. In combination, a hose coupling comprising a tubular member having an internal and an external shoulder intermediate the ends thereof, a series of external wedge shaped projections on one end of said coupling against which a hose section is adapted to be held with one end thereof abutting against the external shoulder, the opposite end of said coupling being internally threaded for cooperating with an external pipe section, a protecting lining for said coupling, one end of said lining being adapted to be clamped between the internal shoulder of the coupling and end of the pipe section, and a lining for the hose, said lining for the coupling and the lining for the hose being substantially continuous.

In testimony whereof I affix my signature.

GEORGE F. YACKEY.